(12) United States Patent
Cooper et al.

(10) Patent No.: US 9,890,072 B2
(45) Date of Patent: Feb. 13, 2018

(54) GLASS PRECURSOR GEL

(71) Applicant: Owens-Brockway Glass Container Inc., Perrysburg, OH (US)

(72) Inventors: Scott P. Cooper, Maumee, OH (US); Michael P Remington, Toledo, OH (US); Scott Weil, Maumee, OH (US); Tilak Gullinkala, Perrysburg, OH (US); Sutapa Bhaduri, Holland, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 14/676,372

(22) Filed: Apr. 1, 2015

(65) Prior Publication Data
US 2016/0289114 A1 Oct. 6, 2016

(51) Int. Cl.
*C03B 5/00* (2006.01)
*C03B 9/13* (2006.01)
*C03C 1/00* (2006.01)
*C03B 9/193* (2006.01)
*C03C 3/087* (2006.01)
*C03C 3/078* (2006.01)
*C03C 3/089* (2006.01)
*C03C 3/102* (2006.01)

(52) U.S. Cl.
CPC .............. *C03C 1/006* (2013.01); *C03B 5/00* (2013.01); *C03B 9/193* (2013.01); *C03C 3/078* (2013.01); *C03C 3/087* (2013.01); *C03C 3/089* (2013.01); *C03C 3/102* (2013.01); *C03C 2203/24* (2013.01)

(58) Field of Classification Search
CPC .................................................. C03B 5/2356
See application file for complete search history.

(56) References Cited

U.S. PATENT DOCUMENTS

| | | | |
|---|---|---|---|
| 2,204,113 A | 6/1940 | Allen | |
| 2,976,161 A | 3/1961 | Smith | |
| 3,081,180 A | 3/1963 | Krinov | |
| 3,542,534 A | 11/1970 | Yamamoto | |
| 3,753,743 A | 8/1973 | Kakuda et al. | |
| 3,799,754 A | 3/1974 | Thomas | |
| 3,967,943 A | 7/1976 | Seeley | |
| 3,969,100 A | 7/1976 | Kuna et al. | |
| 4,018,616 A * | 4/1977 | Sugahara | C01B 33/00 106/623 |
| 4,023,976 A | 5/1977 | Bauer et al. | |
| 4,031,175 A | 6/1977 | Cooper | |
| 4,200,445 A * | 4/1980 | Bihuniak | C01B 33/26 423/332 |
| 4,211,568 A | 7/1980 | Davis | |
| 4,514,329 A * | 4/1985 | Wakabayashi | C03B 1/00 501/12 |
| 4,767,429 A * | 8/1988 | Fleming | C03B 19/01 423/331 |
| 4,851,150 A | 7/1989 | Hench et al. | |
| 4,857,289 A | 9/1989 | Nauroth et al. | |
| 5,000,933 A | 3/1991 | Novotny et al. | |
| 5,084,262 A | 1/1992 | Novotny et al. | |
| 5,196,382 A | 3/1993 | Hench et al. | |
| 5,487,882 A * | 1/1996 | Hu | C01B 39/22 423/700 |
| 7,260,960 B2 | 8/2007 | Carty | |
| 2002/0162358 A1* | 11/2002 | Jeanvoine | C03B 5/225 65/134.5 |
| 2010/0207050 A1* | 8/2010 | Kajiwara | B01J 20/103 252/62 |
| 2011/0192321 A1 | 8/2011 | Bohlander et al. | |
| 2011/0236846 A1* | 9/2011 | Rue | F27B 3/205 432/195 |

FOREIGN PATENT DOCUMENTS

| | | |
|---|---|---|
| EP | 0826630 B1 | 12/2001 |
| EP | 1411032 A1 | 4/2004 |
| GB | 2181727 A | 4/1987 |
| WO | WO 91/19673 | 12/1991 |

OTHER PUBLICATIONS

International Search Report and Written Opinion, Int. Application No. PCT/US2016/024001, Int. Filing Date: Mar. 24, 2016, Applicant: Owens-Brockway Glass Container Inc., dated Jun. 23, 2016.
Kasgoz, Ahmet, et al., "Sol-gel Preparation of Borosilicates," Journal of Non-Crystalline Solids, North-Holland Physics Publishing, Amsterdam, NL, vol. 243, No. 2-3, Feb. 1, 1999, pp. 168-174, XP004364139, ISSN: 0022-3093.
J.C. Potts, J. Am. Ceramc. Soc.27 [8] 225-231(1944).
ID Tykachnsky Glass Ceram. 13, 7-14 (1956).
M. Boffe Glass Technol., 3 [4] 117-123 (1962).
S Suda J Non-Cryst Solids 255 (1999) 178-184.
GL Kalousek, National Bureau of Standards Research Paper RP1590 (1944).
SJ Way Cement and Concrete Research 22 (1992) 915-926.

* cited by examiner

*Primary Examiner* — Cynthia Szewczyk

(57) ABSTRACT

A glass precursor gel and a method of making a glass product from the glass precursor gel are disclosed. The glass precursor gel includes a bulk amorphous oxide-based matrix that is homogeneously chemically mixed and includes 30 mol % to 90 wt. % silica and at least one of the following: (A) 0.1 mol % to 25 mol % of one or more alkali oxides in sum total, (B) 0.1 mol % to 25 mol % of one or more alkaline earth oxides in sum total, (C) 1 mol % to 20 mol % boric oxide, (D) 5 mol % to 80 mol % lead oxide, or (E) 0.1 mol % to 10 mol % aluminum oxide. A method of making a glass product from the glass precursor gel involves obtaining the glass precursor gel, melting the glass precursor gel into molten glass, and forming the molten glass into a glass product.

20 Claims, 3 Drawing Sheets

| Component (mol%) | Soda-Lime-Silica Glass | Borosilicate Fiber (E-Glass) | Borosilicate Glass (Flat Panel Display) | Borosilicate Glass (Low Thermal Expansion) | Borosilicate Glass (Fiber Wool) | Lead Sealing Glass |
|---|---|---|---|---|---|---|
| $SiO_2$ | 63–81 | 43–74 | 60–80 | 65–85 | 50–78 | 30–67 |
| $Al_2O_3$ | 0–2 | 6–10 | 5–15 | 1–5 | 0–4 | 0–7 |
| $B_2O_3$ | -- | 0–8.5 | 5–15 | 8–15 | 2.5–9 | 0–25 |
| MgO | 0–6 | 0.5–9 | -- | -- | 1.5–8 | 0–2 |
| CaO | 7–14 | 15–28 | 2–10 | 0–2.5 | 5–15 | 0–5 |
| SrO | -- | -- | 0–5 | -- | -- | -- |
| BaO | -- | -- | 0–3 | -- | -- | 4–10 |
| $Li_2O$ | 0–2 | 0–1 | -- | -- | -- | -- |
| $Na_2O$ | 9–15 | 0–2.5 | -- | 3–9 | 12–18 | 2–10 |
| $K_2O$ | 0–1.5 | 0–0.5 | -- | -- | 0–1.5 | 3–15 |
| $Fe_2O_3$ | 0–0.6 | 0–0.3 | -- | -- | 0–0.3 | -- |
| $Cr_2O_3$ | 0–0.2 | 0–0.2 | -- | -- | -- | -- |
| $MnO_2$ | 0–0.2 | -- | -- | -- | -- | -- |
| $Co_3O_4$ | 0–0.1 | -- | -- | -- | -- | -- |
| $TiO_2$ | 0–0.8 | 0–1 | -- | -- | 0–0.2 | -- |
| $SO_3$ | 0–0.2 | -- | -- | -- | -- | -- |
| Se | 0–0.1 | -- | -- | -- | -- | -- |
| F | 0–0.1 | 0–2 | -- | -- | 0–2.5 | -- |
| $ZrO_2$ | -- | -- | -- | -- | -- | 0–3 |
| PbO | -- | -- | -- | -- | -- | 15–80 |

*FIG. 2*

| Component (mol%) | Soda-Lime-Silica Glass | Borosilicate Fiber (E-Glass) | Borosilicate Glass (Flat Panel Display) | Borosilicate Glass (Low Thermal Expansion) | Borosilicate Glass (Fiber Wool) | Lead Sealing Glass |
|---|---|---|---|---|---|---|
| $SiO_2$ | 63–81 | 43–74 | 60–80 | 65–85 | 50–78 | 30–67 |
| $Al_2O_3$ | 0–2 | 6–10 | 5–15 | 1–5 | 0–4 | 0–7 |
| $B_2O_3$ | — | 0–8.5 | 5–15 | 8–15 | 2.5–9 | 0–25 |
| $MgO$ | 0–6 | 0.5–9 | — | — | 1.5–8 | 0–2 |
| $CaO$ | 7–14 | 15–28 | 2–10 | 0–2.5 | 5–15 | 0–5 |
| $SrO$ | — | — | 0–5 | — | — | — |
| $BaO$ | — | — | 0–3 | — | — | 4–10 |
| $Li_2O$ | 0–2 | 0–1 | — | — | — | — |
| $Na_2O$ | 9–15 | 0–2.5 | — | 3–9 | 12–18 | 2–10 |
| $K_2O$ | 0–1.5 | 0–0.5 | — | — | 0–1.5 | 3–15 |
| $Fe_2O_3$ | 0–0.6 | 0–0.3 | — | — | 0–0.3 | — |
| $Cr_2O_3$ | 0–0.2 | 0–0.2 | — | — | — | — |
| $MnO_2$ | 0–0.2 | — | — | — | — | — |
| $Co_3O_4$ | 0–0.1 | — | — | — | — | — |
| $TiO_2$ | 0–0.8 | 0–1 | — | — | — | — |
| $SO_3$ | 0–0.2 | — | — | — | 0–0.2 | — |
| $Se$ | 0–0.1 | — | — | — | — | — |
| $F$ | 0–0.1 | 0–2 | — | — | 0–2.5 | — |
| $ZrO_2$ | — | — | — | — | — | 0–3 |
| $PbO$ | — | — | — | — | — | 15–80 |

*FIG. 3*

GLASS PRECURSOR GEL

The present disclosure is directed to a glass precursor gel for making glass products and, more particularly, to a glass precursor gel that rapidly converts into molten glass when heated.

BACKGROUND AND SUMMARY OF THE DISCLOSURE

Glass products have long been made from a pre-formulated feedstock (also sometimes termed a glass batch) that is charged into a glass furnace and melted to produce molten glass for subsequent formation into the desired glass product. A typical feedstock includes a physical mixture of virgin raw materials and, optionally, recycled glass materials known in the industry as "cullet." The virgin raw materials contain quartz sand (crystalline $SiO_2$) and other ingredients, such as soda ash ($Na_2CO_3$) and limestone ($CaCO_3$) for soda-lime-silica glass, for example, and the cullet primarily contains shards of glass from previously-formed consumer or commercial glass products. The cullet component of the feedstock can vary based on the glass-forming process being practiced and the desired characteristics of the final glass product (e.g., color, transparency, etc). In many instances, however, the feedstock may contain up to about 80 weight percent cullet, with the remainder being virgin raw materials which may or may not include, in addition to the ingredients listed above, a small percentage of other ingredients including glass network formers, network modifiers, colorants, decolorants, fining agents, and redox agents, to name but a few.

The residence time of the conventional glass feedstock in the glass furnace is relatively long. This can be attributed to several factors. First, the largest component of the virgin raw materials, quartz sand, and usually some of the other virgin raw material ingredients—e.g., soda ash and limestone for soda-lime-silica glass—are crystalline materials. Their crystal structures, including intermediate crystalline phases, are generally present up to about 1200° C., as melting and dissolution of these materials does not occur instantaneously. Second, the glass feedstock needs to be dispersed and homogeneously mixed by convection after being melted to produce molten glass, which is a time-consuming process. Quartz sand, in particular, takes the longest to disperse on account of its slow dissolution rate and the tendency to agglomerate into $SiO_2$-rich regions within the glass melt known as "cord." The presence of cord is indicative of glass inhomogeneity and may result in imperfections or defects in the finished glass product. Third, some of the virgin raw material ingredients—e.g., soda ash and limestone for soda-lime-silica glass—are carbonate-containing materials that, when melted, release carbon dioxide ($CO_2$). The evolution of carbon dioxide during feedstock melting introduces bubbles in the resultant molten glass, which, in turn, can cause a thin spot or bubble defect in the finished glass product. Any such bubbles are typically removed from the molten glass in a process known as "refining the glass." To address the challenges associated with melting and homogenizing crystalline raw materials and to remove bubbles caused by carbon dioxide evolution, among other factors, conventional glass feedstocks are usually subjected to high temperatures and heating times of 24 hours or more in the glass furnace in order to obtain suitably-refined and chemically homogenized molten glass.

The melting of the glass feedstock can be made less taxing if some of the virgin raw materials are replaced with cullet in the feedstock. The cullet accelerates the melting of the feedstock and lowers furnace energy consumption as compared to a feedstock that contains all virgin raw materials. Cullet has this effect because it has already been melted, mixed, and formed into a glass product and will not release carbon dioxide when re-melted since it is not an intrinsic carbonate-containing material. But cullet is not widely available as a commodity in some regions and, even if it is, bulk purchases of the recycled material are subject to great variations in color and other characteristics that may restrict glass manufacturing options. Post-consumer cullet also has the tendency to be contaminated with metals, glues, and other organics, and is sometimes difficult to uniformly mix with virgin raw materials in the glass furnace when melted. Moreover, even with the addition of cullet, current glass manufacturing practices still typically involve melting the glass feedstock and homogenizing/refining the molten glass in the glass furnace at a temperature of around 1400° C. or higher for at least about 24 hours. Such long processing times at elevated temperatures require a lot of energy and slow the overall glass-making process.

One or more embodiments set forth in the present disclosure may achieve any of a variety of objectives including, for example, obtaining a glass precursor gel that can be melted without requiring long residence times in the glass furnace in order to achieve homogeneous and refined molten glass. The glass precursor gel has a bulk amorphous oxide-based matrix that includes a homogeneous chemical mixture of the primary constituent oxides and any secondary materials, in the proportions desired, of the final glass product composition. Moreover, when the glass precursor gel is heated and melted, it releases no more than a negligible amount carbon dioxide due to the fact that it does not include carbonates. Because the glass precursor gel includes an already homogenous chemical mixture of the primary constituent oxides, as well as relatively small amounts of any other secondary materials, and because it does not contain carbonates, it does not require a lengthy refining process; rather, it only needs to be heated for a relatively short period of time to obtain a homogeneous and bubble-free molten glass that is ready for downstream production into a glass product.

The present disclosure embodies a number of aspects that can be implemented separately from or in combination with each other.

In accordance with one aspect of the present disclosure, there is provided a glass precursor gel that comprises a bulk amorphous oxide-based matrix. The amorphous oxide-based matrix is homogeneously chemically mixed and includes 30 mol % to 90 mol % silica and at least one of the following: (A) 0.1 mol % to 25 mol % of one or more alkali oxides (mol % is the sum total), (B) 0.1 mol % to 25 mol % of one or more alkaline earth oxides (mol % is the sum total), (C) 1 mol % to 20 mol % boric oxide ($B_2O_3$), (D) 5 mol % to 80 mol % lead oxide (PbO), or (E) 0.1 mol % to 10 mol % aluminum oxide ($Al_2O_3$). The glass precursor gel has a density of less than 2.0 g/cm$^3$.

In accordance with another aspect of the disclosure, there is provided a method of making a glass product. The method includes obtaining a glass precursor gel that comprises a homogeneously chemically mixed bulk amorphous oxide-based matrix and an extending swelling agent. The bulk amorphous oxide-based matrix has an inorganic network of primary constituent oxides. The primary constituent oxides comprise 30 mol % to 90 mol % silica and one or more of the following: (A) 0.1 mol % to 25 mol % of one or more alkali oxides (mol % is the sum total), (B) 0.1 mol % to 25 mol % of one or more alkaline earth oxides, (C) 1 mol % to 20 mol % boric oxide, (D) 5 mol % to 80 mol % lead oxide, or (E) 0.1 mol % to 10 mol % aluminum oxide. The method further includes melting the glass precursor gel into molten glass and forming the molten glass into a glass product.

In accordance with yet another aspect of the disclosure, there is provided a method of making a glass product. The method involves providing a silicate solution that includes a dissolved sodium silicate comprising a molar ratio of $Na_2O$:$SiO_2$. A soluble calcium salt is added to the silicate solution to displace some of the sodium oxide in the dissolved sodium silicate with calcium oxide and to derive a wet precipitate that comprises a molar ratio of $Na_2O$:$CaO$:$SiO_2$. Solvent is then removed from the wet precipitate to obtain a soda-lime-silica glass precursor gel that comprises a homogeneously chemically mixed bulk amorphous oxide-based matrix having an inorganic network of 60 mol % to 85 mol % silica, 8 mol % to 18 mol % sodium oxide, and 5 mol % to 15 mol % calcium oxide. The soda-lime-silica glass precursor gel is melted into molten glass which, in turn, is formed into a glass product.

BRIEF DESCRIPTION OF THE DRAWINGS

The disclosure, together with additional objects, features, advantages and aspects thereof, will be best understood from the following description, the appended claims and the accompanying drawings, in which:

FIG. 2 is a table listing several different possible compositions of the bulk amorphous oxide-based matrix of the glass precursor gel depending on the desired type of glass sought to be formed; and FIG. 3 is a graph depicting the % transmittance versus wavelength of commercial flint glasses made from conventional soda-lime-glass feedstocks as well as a flint glass made from the SLS precursor gel discussed in this disclosure.

DETAILED DESCRIPTION

Figure 1:
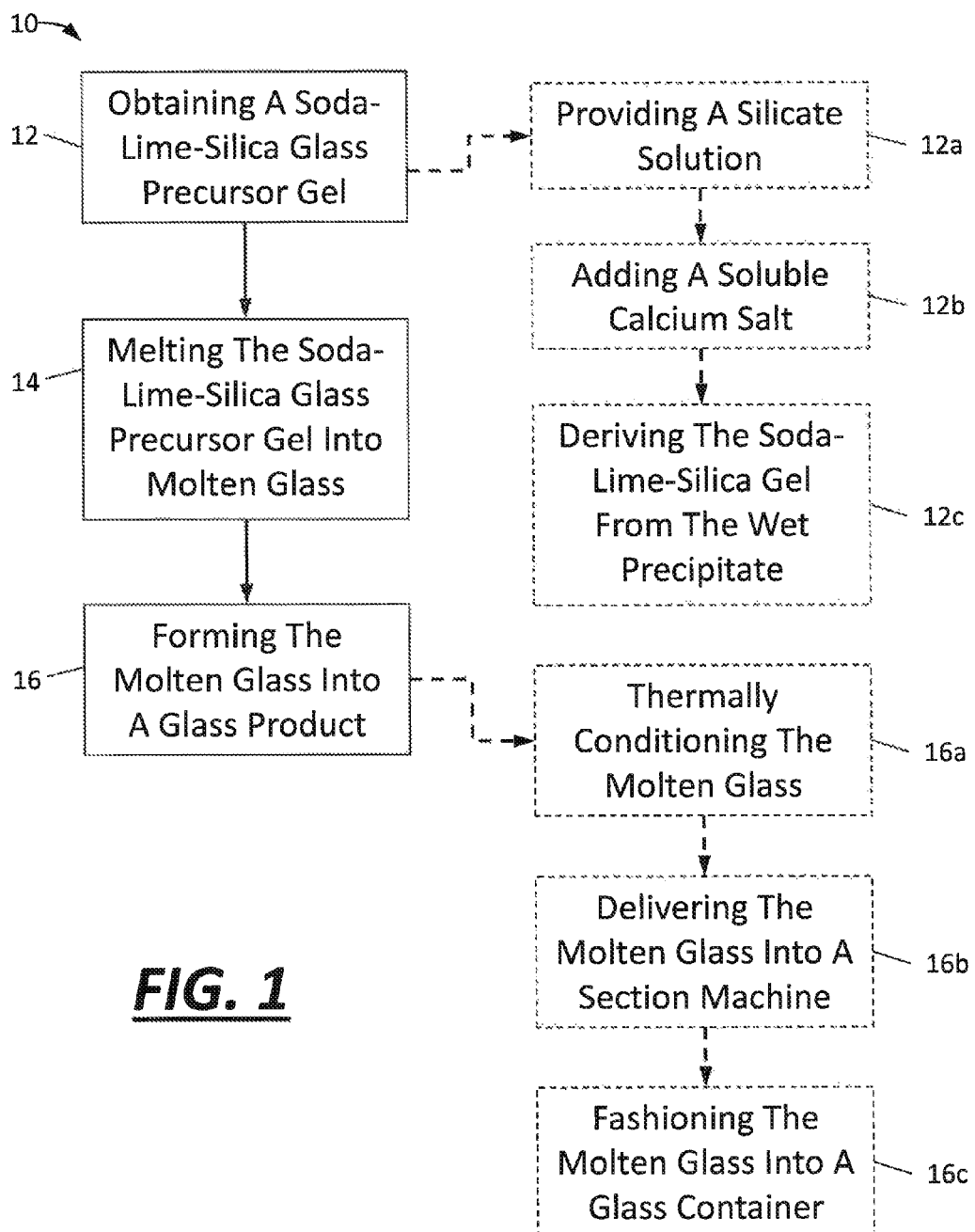
FIG. 1 is a flow diagram that depicts a method of preparing and using a glass precursor gel, in particular a soda-lime-silica glass precursor gel, to form a soda-lime-silica ("SLS") glass product.

A glass precursor gel that can be used as an alternative to traditional glass feedstock mixtures for deriving molten glass is disclosed. The glass precursor gel comprises a bulk amorphous (i.e., non-crystalline) oxide-based matrix characterized by an inorganic network of at least the primary constituent oxides of the final glass composition. The primary constituent oxides are present in the amorphous oxide-based matrix at the desired proportions of the final glass composition. More specifically, the primary glass-forming constituent oxides included in the amorphous oxide-based matrix are 30 mol % to 90 mol % silica and one or more of the following: (A) 0.1 mol % to 25 mol % of one or more alkali oxides (mol % is the sum total); (B) 0.1 mol % to 25 mol % of one or more alkaline earth oxides (mol % is the sum total); (C) 1 mol % to 20 mol % boric oxide ($B_2O_3$); (D) 5 mol % to 80 mol % lead oxide (PbO), or (E) 0.1 mol % to 10 mol % aluminum oxide ($Al_2O_3$). The one or more alkali oxides may be selected from the group consisting of lithium oxide ($Li_2O$), sodium oxide ($Na_2O$), potassium oxide ($K_2O$), rubidium oxide ($Rb_2O$), cesium oxide ($Cs_2O$), and combinations thereof, and the one or more alkaline earth oxides may be selected from the group consisting of magnesium oxide (MgO), calcium oxide (CaO), strontium oxide (SrO), barium oxide (BaO), and combinations thereof.

In one embodiment, the amorphous oxide-based matrix may include at least 60 mol % to 85 mol % silica ($SiO_2$), 8 mol % to 18 mol % sodium oxide ($Na_2O$), and 5 mol % to 15 mol % calcium oxide (CaO) as the primary constituent oxides, in which case the gel is composed to produce soda-lime-silica glass. In other embodiments, the glass precursor gel may be composed to produce other types of glass including borosilicate glass and lead sealing glass. Regarding borosilicate glass, the amorphous oxide-based matrix may include at least 30 mol % to 85 mol % silica and 1 mol % to 20 mol % boric oxide, along with at least one of 2 mol % to 25 mol % calcium oxide or 2 mol % to 20 mol % sodium oxide, as the primary constituent oxides depending on the anticipated end-use. Regarding lead sealing glass, the amorphous oxide-based matrix may include at least 30 mol % to 70 mol % silica, 15 mol % to 60 mol % lead oxide, and at least one of 3 mol % to 15 mol % potassium oxide, 2 mol % to 10 mol % sodium oxide, or 4 mol % to 10 mol % boron oxide, as the primary constituent oxides.

In addition to the primary constituent oxides, the amorphous oxide-based matrix may optionally include a number of secondary materials that are commonly used in the glass manufacturing industry. Examples of such secondary materials are up to 25 mol % total of other glass network-formers, up to 2 mol % total of coloring and/or decoloring agents, and up to 20 mol % total of other materials that can affect the physical properties and/or the redox state of the final glass product composition. Specific other glass network-formers that may be added include one or more of phosphorus oxide ($P_2O_5$) and germanium oxide ($GeO_2$). Specific colorants and decolorants that may be added include the elemental forms or oxide compound forms of one or more of selenium, chromium, manganese, iron, cobalt, nickel, copper, niobium, molybdenum, silver, cadmium, indium, tin, gold, cerium, praseodymium, neodymium, europium, gadolinium, erbium, and uranium. And specific materials that can affect the physical properties and/or the redox state of the glass include one or more of carbon (0 mol % to 3 mol %), nitrates (0 mol % to 3 mol %), selenium (0 mol % to 1 mol %), titanium oxide ($TiO_2$) (0 mol % to 5 mol %), arsenic oxide ($As_2O_3$) (0 mol % to 2 mol %), vanadium oxide ($V_2O_5$) (0 mol % to 5 mol %), fluorines (0 mol % to 2 mol %), chlorines (0 mol % to 2 mol %), and sulfates (0 mol % to 2 mol %).

The exact composition of the amorphous oxide-based matrix including the proportions of its primary constituent oxides and optional secondary materials can be varied to achieve any of the large variety of glass chemistries that may be desired in the final glass product. Both the physical and chemical properties of the resultant glass derived from the glass precursor gel can be affected by variances in the relative proportions of the primary constituent oxides as well as the inclusion or exclusion of certain secondary materials in the amorphous oxide-based matrix. For example, certain exemplary glass chemistry formulations of different types of finished glass are enumerated in FIG. 2. Accordingly, in order to derive these types of finished glass from the glass precursor gel, the amorphous oxide-based matrix can be prepared to have the same proportions of the primary constituent oxides and secondary materials so that, upon melting, a molten glass is obtained that can be formed by standard techniques into the glass product.

Within the amorphous oxide-based matrix, the primary constituent oxides and any secondary materials, which may or may not be present, are homogeneously chemically mixed. The term "homogeneously chemically mixed" and its grammatical variations, as used herein, means that multiple different samples of the gel will have the same mole percentages of the three primary constituent oxides present in the greatest amounts in the amorphous oxide-based matrix. Different samples can be said to have the same mole percentages of the three primary constituent oxides when the mole percent of each primary constituent oxide in each sample lies within a range of ±3% of the arithmetic average [i.e., (0.97)·(average)<sample<(1.03)·(average)] of its respective oxide as determined from the various samples taken. For example, five random, different samples of a glass precursor gel have been found through x-ray fluorescence to have the following mole percentages of the three main primary constituent oxides (here, silica, sodium oxide, and calcium oxide):

TABLE 1

Compositions of Samples

| Sample # | Mole Percentage of: | | |
|---|---|---|---|
| | $SiO_2$ | $Na_2O$ | CaO |
| 1 | 72.3 | 14.2 | 12.1 |
| 2 | 72.2 | 14.1 | 12.2 |
| 3 | 71.8 | 14.2 | 12.5 |
| 4 | 72.1 | 14.1 | 12.4 |
| 5 | 72.5 | 13.9 | 12.3 |
| Avg. | 72.2 | 14.1 | 12.3 |

As can be seen, in this group of samples, the arithmetic average of silica, sodium oxide, and calcium oxide as determined from the five samples is 72.2 mol %, 14.1 mol %, and 12.3 mol %, respectively. The range of ±3% of the arithmetic average for each of the primary constituent oxides can then be calculated as 70.03-74.34 mol % for silica, 13.68-14.52 mol % for sodium oxide, and 11.93-12.67 mol % for calcium oxide. The mole percentage of each primary constituent oxide in each sample clearly falls within those prescribed ranges, and thus confirms that the amorphous oxide-based matrix of the glass precursor gel is homogeneously chemically mixed.

The amorphous oxide-based matrix is light, porous, and hygroscopic, which allows for an extending swelling agent, such as water, to be entrapped within the inorganic network of oxides. Indeed, water is typically retained in the glass precursor gel at a relatively high amount as compared to cullet. In particular, cullet evolves water vapor up to about 125° C. when heated at a rate of 5° C. per minute starting from STP (1 atm pressure and 20° C.), and is thoroughly dried for the most part at 150° C., which is typical of physically entrained water. On the other hand, the glass precursor gel continues to evolve water vapor—an additional 1-10 wt. %—above 125° C. and up to 400° C. when subjected to the same incremental heating, and may even retain as much as 0.5 wt. % water at 400° C., which is indicative of water that is chemically bound to amorphous oxide-based matrix as a swelling agent. The presence of retained chemically-bound water within the amorphous oxide-based matrix may be advantageous in some instances since it acts as a flux that lowers the processing temperature of molten glass, particularly at low temperatures. And despite the fact that the glass precursor gel typically includes chemically-entrained water within its amorphous oxide-based matrix, the glass precursor gel has a density of less than 2.0 g/cm³, preferably between about 1.6 g/cm³ and about 1.85 g/cm³ including all ranges and sub-ranges therebetween, and a surface area of at least 20 m²/g, preferably about 25 m²/g to about 40 m²/g including all ranges and sub-ranges therebetween, as measured by nitrogen BET adsorption. The glass precursor gel is thus less dense and has a higher surface area than cullet.

The composition of the glass precursor gel facilitates rapid melting into molten glass while avoiding long residence times in the glass furnace. The glass precursor gel does not include large quantities of crystalline materials and, most notably, the amorphous oxide-based matrix does not contain any crystalline precursor materials of silica such as, for example, quartz sand. The absence of quartz sand is noteworthy here. Unlike conventional glass feedstocks that contain a fair amount of quartz sand, which generally has a slow dissolution rate, the glass precursor gel does not have to be maintained in a molten state at high temperatures for long durations in order to achieve satisfactory $SiO_2$ dissolution. The amorphous oxide-based matrix also includes virtually no carbonate-containing materials and, as such, will produce no more than a negligible amount of $CO_2$ upon melting and hence no more than a negligible amount of bubbles within the molten glass. The molten glass obtained from the glass precursor gel therefore does not have to be refined by removing substantial amounts of entrained bubbles through extended heating times. Given that the amorphous oxide-based matrix is already homogeneously chemically mixed and does not contain crystalline precursor materials of the primary constituent oxides or more than an insignificant amount of carbonate-containing materials, the glass precursor gel does not have to be heated to as high of a temperature or maintained at an elevated temperature for as long of a timeframe as conventional glass feedstocks in order to obtain a molten glass that is suitable for downstream processing into a glass product.

To be sure, as mentioned above, conventional soda-lime-silica glass feedstocks are typically melted in a furnace and maintained at 1400° C. or higher for at least about 24 hours in order to obtain a suitably refined and homogenized molten glass. The glass precursor gel set forth in the present disclosure does not require—although it certainly does not preclude—such heat cycle demands. The gel, in fact, can be heated to above its melting temperature for as little as 30 minutes and still result in molten glass that is refined, homogenized, and ready for further glass processing (e.g., fashioning into a glass container in an individual section machine). It is sufficient, for instance, to heat a soda-lime-silica glass precursor gel to around 1450° C. for as little as 30 minutes to 4 hours to melt the gel into molten glass to the degree desired. Alternatively, if a lower heating temperature is preferred, the soda-lime-silica glass precursor gel can be heated to around 1200° C. for 16 hours to 24 hours. Each of these heating options constitutes a significant energy savings compared to the melting of conventional soda-lime-silica glass feedstocks.

The glass precursor gel can be chemically synthesized. By doing so, the three rate-limiting steps of conventional glass making—dissolution of quartz sand, bubble removal, and homogenization/mixing of the primary constituent oxides—are accomplished at low temperatures by way of chemical reactions, not the standard procedure in which crystalline raw materials (and optionally some cullet) are physically mixed, melted, and maintained in a molten state to facilitate dissolution. Specifically, the glass precursor gel can be chemically synthesized at temperatures below 300° C., which is well below the melting point of quartz sand. And, once formed, the glass precursor gel can be melted into molten glass, which can then be formed into a glass product such as, for example, a glass container or flat glass or tableware, to name but a few. Such melting of the glass precursor gel can be attained more quickly than conventional glass feedstocks because the chemical synthesis of the homogeneously chemically mixed gel is conducted through chemical reactions outside of the glass furnace or other apparatus prior to melting. The low-temperature pre-melting chemical synthesis of the gel can ultimately lower the furnace energy consumption and reduce the infrastructure and furnace footprint attributed to each glass product produced.

The glass precursor gel can be chemically synthesized, as will be further described and demonstrated below in the context of a soda-lime-silica precursor gel, by precipitating the gel from a soluble alkali silicate. In general, a silicate solution containing the soluble alkali silicate is first prepared. One way to prepare the silicate solution, for example, is to hydrothermally dissolve quartz sand in a caustic aqueous alkali-based solvent. The ratio of $SiO_2$ to the alkali oxide in the alkali silicate can be adjusted in solution as needed. Next, the alkali silicate is precipitated out of solution with an alkaline earth salt to provide a wet precipitate that, by design, has the same proportions of the primary constituent oxides as the desired end-use glass composition. And finally, solvent may be removed from the wet precipitate to derive the glass precursor gel.

The glass precursor gel can be used to make a glass product as shown diagrammatically in FIG. 1. There, the method of making a glass product is illustrated, and described in the corresponding text, specifically in the context of using one type of the glass precursor gel-namely, a soda-lime-silica ("SLS") glass precursor gel. The method is identified by reference numeral 10 and includes the following steps: obtaining the SLS glass precursor gel (step 12); melting the SLS glass precursor gel into molten glass (step 14); and forming the molten glass into a glass product (step 16). The method is preferably used to form glass containers such as bottles and jars. These types of containers may include a glass body that defines an interior for holding some content. The interior is typically accessible from a mouth that is located at one axial end of the glass body. The mouth may be constructed to receive a cap or lid. Other types of glass products may of course be made from the SLS glass precursor gel besides containers. While the method shown and described with reference to FIG. 1 is focused on the preparation and use of a SLS glass precursor gel, those skilled in the art will know and understand how to adapt the following teachings to other types of glass precursor gels such as gels composed to produce, for example, borosilicate glass or lead sealing glass.

The SLS glass precursor gel is comprised of a bulk amorphous oxide-based matrix that includes at least silica ($SiO_2$), sodium oxide ($Na_2O$), and calcium oxide (CaO) as the primary constituent oxides, and chemically-entrained water as the extending swelling agent. The amorphous oxide-based matrix of the SLS glass precursor gel, for example, preferably comprises 60 mol % to 85 mol % silica, 8 mol % to 18 mol % sodium oxide, and 5 mol % to 15 mol % calcium oxide. The amorphous oxide-based matrix may also optionally include up to about 10 mol % combined of aluminum oxide, magnesium oxide (MgO), and/or potassium oxide ($K_2O$) as additional primary constituent oxides, and any of the other secondary materials recited above including other glass-network formers, colorants such as iron oxide ($Fe_2O_3$), other agents (e.g., oxidizers, reducers, fining agents, etc.), and impurities common in the glass industry. Moreover, as described above, water is chemically-entrained within the amorphous oxide-based matrix such that, when the gel is heated at a rate of 5° C. per minute starting from STP (1 atm pressure and 20° C.), water vapor continues to evolve above 125° C. and up to 400° C., and may even retain as much as 0.5 wt. % water at 400° C. The SLS glass precursor gel is porous and friable, having a density of less than about 2.0 g/cm$^3$ and a surface area greater than about 20 m$^2$/g, as described above, and the components that make up the amorphous oxide-based matrix are already homogenously chemically mixed prior to being melted in step 14.

The SLS glass precursor gel can be obtained in step 12 in numerous ways. In one embodiment, as depicted here in FIG. 1, the SLS glass precursor gel is obtained by (1) providing a silicate solution that includes a dissolved sodium silicate (step 12a); (2) adding a soluble calcium salt to the silicate solution to derive a wet precipitate that has the same proportions of the primary constituent oxides as the amorphous oxide-based matrix of the SLS glass precursor gel (step 12b); and (3) deriving the SLS glass precursor gel from the wet precipitate (step 12c). A specific implementation of steps 12a-12c will be described below in more detail. It should be understood, however, that the SLS glass precursor gel can also be obtained through other mechanisms not expressly described, but nonetheless known to skilled artisans, including alternative ways to provide the silicate solution in step 12a such as by purchasing the silicate solution or chemically preparing the solution by melting a mixture of quartz sand and soda ash and then dissolving the resultant product in water.

The silicate solution can be provided in step 12a by hydrothermally dissolving quartz sand in a caustic aqueous sodium-based solvent. The caustic aqueous sodium-based solvent may be a strong sodium base, such as sodium hydroxide (NaOH), which is preferably concentrated to greater than 10 wt. % (of the sodium base) so as to make dissolution of the quartz sand easier. One example of a suitable strong sodium base is 18 wt. % NaOH. The hydrothermal dissolution of quartz sand may be accomplished in a pressure vessel at a pressure above atmospheric pressure. There, the quartz sand may be dissolved in the caustic aqueous sodium-based solvent at a temperature between about 25° C. and about 300° C. including all ranges and sub-ranges therebetween, preferably between about 200° C. and about 300° C., and a pressure of about 10 atmospheres to about 100 atmospheres including all ranges and sub-ranges therebetween, preferably about 30 atmospheres to about 50 atmospheres, over the course of about 3 hours to about 24 hours including all ranges and sub-ranges therebetween. The silicate solution formed under these hydrothermal conditions contains a dissolved solids phase of sodium silicate. The dissolved sodium silicate produced has the general chemical formula $Na_2O \cdot xSiO2$ with x ranging from 1.5 to 3.75 including all ranges and sub-ranges therebetween.

The ratio of $Na_2O$ to $SiO_2$ in the dissolved sodium silicate may have to be adjusted to ensure the amorphous oxide-based matrix of the SLS glass precursor gel has the proper mole percentages of silica, sodium oxide, and calcium oxide. In particular, the mole percent proportions of the primary constituent oxides listed above can be met when the amorphous oxide-based matrix has a molar ratio of $Na_2O$:CaO:$SiO_2$ of approximately 1:1:6 with variances between 0.8:0.8:6 and 1.4:1.3:6 being acceptable for typical container glass. The dissolved sodium silicate in the silicate solution, however, typically includes 2-3 moles of $Na_2O$ for every 6 moles of $SiO_2$. To adjust the molar ratio of $Na_2O$ to $SiO_2$, if necessary, a multiple-step technique may be employed. First, the molar ratio of $Na_2O$ to $SiO_2$ in the dissolved sodium silicate may be reduced with an acid. Nitric acid ($HNO_3$), for example, can be added to the silicate solution in a quantity that neutralizes some of the $Na_2O$ to bring the molar ratio of $Na_2O$ to $SiO_2$ in the dissolved sodium silicate down to approximately 2:6. Nitric acid neutralizes sodium silicate into silicic acid ($SiH_4O_4$) and sodium nitrate ($NaNO_3$). A further reduction of the molar ratio of $Na_2O$ to $SiO_2$—down to approximately 1:6—is achieved in step 12(b) when, as will be explained in more detail below, sodium is displaced by calcium.

Other primary constituent oxides and secondary materials that may be desired in the amorphous oxide-based matrix of the SLS glass precursor gel may be added into the silicate solution during step 12a as a solid or they may be dissolved in water prior to their addition into the solution. Some other materials that may be added into the silicate solution include aluminum oxide, magnesium oxide, potassium oxide, iron oxide, titanium oxide, zirconium oxide, barium oxide, strontium oxide (SrO), sulfur trioxide ($SO_3$), and oxides of selenium, cobalt, chromium, manganese, and lead. Aluminum oxide, in particular, which enhances the chemical durability of soda-lime-silica glass and reduces the tendency of devitrification in the molten glass, may be introduced by adding an alumina-bearing mineral to the caustic aqueous sodium-based solvent along with quartz sand under hydrothermal conditions. Adding the alumina-bearing mineral at this time results in aluminum oxide being chemically integrated into the dissolved sodium silicate during hydrothermal dissolution of the quartz sand. Some examples of alumina-bearing minerals that may be used here are nepheline syenite, aplite, and calumite slag. The aluminum oxide may also be introduced into the silicate solution in the form of dissolved sodium aluminate.

The list of secondary materials that may be introduced into the silicate solution during step 12a is more extensive than those just mentioned. Colorants and decolorants may be added such as one or more of iron oxides (e.g., FeO and/or $Fe_2O_3$), chromium oxides (e.g., CrO or $Cr_2O_3$), cobalt oxides (e.g., CoO or $Co_2O_3$), nickel, copper, selenium, manganese dioxide, cerium oxide, titanium, and a combination of sulfur, iron, and carbon. Another class of secondary materials that can be added to the silicate solution is fining agents such as, for example, the combination of sodium sulfate ($Na_2SO_4$), carbon, arsenic oxide, and antimony oxide. Still further, oxidizers or reducers can be added to the silicate solution to modify, if desired, the redox number of the molten glass derived from the SLS glass precursor gel. Examples of common oxidizers and reducers include calcium sulfate ($CaSO_4$), sodium nitrate ($NaNO_3$), potassium nitrate ($KNO_3$), iron pyrite ($FeS_2$), and graphite.

After the silicate solution has been formulated in step 12a, the soluble calcium salt may be added to the silicate solution in step 12b to derive a wet precipitate that has the same proportions of the primary constituent oxides (e.g., silica, sodium, and calcium) desired in the amorphous oxide-based matrix of the SLS glass precursor gel. This step involves adding the soluble calcium salt to the silicate solution in an amount that brings the molar ratio of $Na_2O:CaO:SiO_2$ in the wet precipitate to approximately 1:1:6, which is the desired molar ratio of the amorphous oxide-based matrix and, in turn, the soda-lime-silica glass produced from the SLS glass precursor gel. The soluble calcium salt may include, for example, calcium nitrate ($Ca(NO_3)_2$), calcium chloride ($CaCl_2$), calcium hydroxide ($Ca(OH)_2$) or any other soluble calcium salt or combination of soluble salts that provides a source of calcium ions. When added to the silicate solution, the calcium ions provided by the soluble calcium salt displace sodium in the dissolved sodium silicate, thus introducing calcium oxide into the silicate, which causes the newly-modified sodium silicate to precipitate out of solution as the wet precipitate. And since every 1 mole of calcium ions (which results in a corresponding mol of CaO) displaces 1 mole of $Na_2O$ in the dissolved sodium silicate, the amount of the soluble calcium salt that needs to be added to the silicate solution to provide the wet precipitate with the 1:1:6 molar ratio of $Na_2O:CaO:SiO_2$ can be easily calculated based on the molar ratio of $Na_2O:SiO_2$ in the silicate solution from step 12a.

The displacement of $Na_2O$ with CaO, and the precipitation of the wet precipitate, is preferably carried out with the silicate solution being as concentrated as possible. It has been found, in fact, that as the dissolved sodium silicate becomes more dilute in the silicate solution, the amount of $Na_2O$ in the wet precipitate decreases while the amounts of $SiO_2$ and CaO are not similarly affected. This, in turn, can increase the respective mole percentages of $SiO_2$ and CaO in the wet precipitate, potentially beyond what is acceptable, due to the isolated loss of $Na_2O$. The potential for the unintended loss of $Na_2O$ during step 12b can thus be countered by performing step 12 with a concentrated silicate solution. A suitably concentrated silicate solution may comprise at least 5 wt. % sodium silicate at the end of step 12a and, more preferably, between 25 wt. % and 40 wt. % sodium silicate at the end of step 12a.

The phenomenon of isolated $Na_2O$ loss from the wet precipitate based on the concentration of the silicate solution has been demonstrated in a simple experiment. Specifically, four separate samples of 281 grams of STAR-grade sodium silicate were diluted with 0 L, 1 L, 2 L, and 3 L of water. Each solution of the sodium silicate was then precipitated with 34.5 grams of calcium nitrate dissolved in 500 mL of water. An SLS glass precursor gel was obtained from each sample, melted and formed into glass, polished, and then analyzed with x-ray fluorescence to determine its glass chemistry composition. Assuming 100% ion exchange efficiency between Na and Ca, the nominal composition of the four samples of glass reported as mol % fractions of the total primary constituent oxides should be about 72.2 mol % $SiO_2$, 15.8 mol % $Na_2O$, and 12.0 mol % CaO. But, as shown below in table 2, the $Na_2O$ mole percentage of the glass (and thus the amorphous oxide-based matrix of the SLS glass precursor gel that formed the glass) began to decrease as the dissolved sodium silicate became more dilute prior to precipitation with calcium nitrate, while the undiluted sample retained nearly all of the $Na_2O$.

TABLE 2

Effects of Dilution on Sodium Oxide Content

| | | Composition (mol %) as a fraction of the total primary glass-forming oxides | | |
| --- | --- | --- | --- | --- |
| | | $SiO_2$ | $Na_2O$ | CaO |
| | Nominal | 72.1 | 15.9 | 12.0 |
| Sodium Silicate Dilution (L) | 0 | 70.4 | 15.7 | 12.5 |
| | 1 | 72.0 | 14.1 | 12.3 |
| | 2 | 72.3 | 10.3 | 15.6 |
| | 3 | 72.8 | 8.9 | 16.5 |

The SLS glass precursor gel can be derived from the wet precipitate in step 12c by removing the liquid solvent. Removal of the liquid solvent can be achieved by any number of separation techniques. Centrifugation, membrane osmosis, filter press, screw press, chemical separation, and/or mechanical compounding (i.e., squeezing) are notable examples of ways to separate the liquid solvent from the wet precipitate. The remaining solids-which have been chemically prepared in steps 12a and 12b to have the desired glass chemistry formulation of soda-lime-silica glass—may then be dried. Drying can be performed in a convection oven at moderate temperatures of about 100° C. to about 500° C., for example, or it can be performed in any other suitable manner at conditions sufficient to extract residual solvent from the recovered solids. Rinsing of the recovered solids between solvent removal and drying may optionally be performed to wash away any reactants and/or reaction byproducts. When the liquid solvent has been satisfactorily removed, the SLS glass precursor gel remains, and at this point the gel is ready to be used as a feedstock for making glass products according to steps 14 and 16.

The SLS glass precursor gel is melted into molten glass in step 14. The melting of the SLS glass precursor gel can be accomplished relatively quickly compared to conventional soda-lime-silica glass feedstocks because the amorphous oxide-based matrix of the gel does not include large amounts of crystalline materials (e.g., quartz sand) or carbonate-containing materials, and it has already been chemically homogenized to the desired glass formulation before melting. In one embodiment, to melt the SLS glass precursor gel into molten glass that is suitable for subsequent glass forming operations, the gel needs only to be heated at a temperature of about 1450° C. or greater for a time period of about 30 minutes to about 4 hours including all ranges and sub-ranges therebetween. Such a heating time is about one-sixth or less than the time it takes to satisfactorily melt conventional glass feedstocks. Longer heating times may of course be practiced, if desired, but they generally are not required. As an example of a longer heating time, the SLS glass precursor gel may be heated to 1200° C. for about 16 hours to about 24 hours, which still produces a homogeneous, bubble-free melt yet consumes less energy than melting conventional soda-lime-silica glass feedstocks.

The SLS glass precursor gel can be melted in a glass furnace. For example, the glass furnace may be a refractory brick-lined vessel that is constructed with gas combustion and thermal radiation heat sources to heat the interior of the vessel. In use, the SLS glass precursor gel may be introduced into the furnace and on top of a glass bath from a side doghouse. The heat sources heat the SLS glass precursor gel from the top and/or bottom and the glass bath heats the floating gel from the bottom. The SLS glass precursor gel eventually melts and assimilates as molten glass into the glass bath. This occurs rather quickly for the SLS glass precursor gel, as compared to conventional soda-lime-silica glass feedstocks, because quartz sand dissolution, bubble removal, and homogenization of the molten glass derived from the SLS glass precursor gel has already been accomplished by low-temperature chemical reactions. As such, the molten glass derived from the SLS glass precursor gel does not have to stay in the furnace in a melted state for very long before it is ready for subsequent formation into a glass product, as indicated by the heat cycle times and temperatures recited above. For this reason, furnaces for melting the SLS glass precursor gel may be designed to be much smaller than traditional glass melting furnaces.

Forming the molten glass derived from the SLS glass precursor glass into a glass product at step 16 can be carried out by any suitable glass forming process. To make a glass container, for instance, the molten glass may be thermally conditioned (step 16a), delivered into a section machine (step 16b), and then fashioned into a glass container (step 16c) of the desired size and shape. The molten glass is preferably thermally conditioned in a forehearth, which is constructed to receive the molten glass from the glass furnace. The forehearth may include heated channels that reduce the temperature of the molten glass down to about 1050° C. to about 1200° C., including all ranges and sub-ranges therebetween, so that the molten glass achieves the desired thermal profile and viscosity for subsequent forming. At the end of the forehearth, a shearing blade may cut off a precise portion of the molten glass, known as a glass gob, which in turn may be delivered by a gob delivery system into a blank mold of the section machine. The section machine, which is preferably an individual section (IS) machine, then fashions the gob into a glass container by the blow-and-blow method, the press-and-blow method, or some other method.

The SLS glass precursor gel has a tendency to produce soda-lime-silica glass with good clarity and color as opposed to the blue/green color that is typically found in soda-lime-silica glass derived from conventional glass feedstocks. The blue/green color, which is attributed to iron impurity, is caused by the reduced state of iron (ferrous, $Fe^{2+}$), which has a broad absorption peak from 600 nm to 1500 nm. Oxidizing the ferrous iron to ferric iron ($Fe^{3+}$) reduces the perceived blue/green coloration of the soda-lime-silica glass since ferric iron is a much weaker colorant that ferrous iron. Such oxidation of any iron content from ferrous to ferric is thought to occur when melting the SLS glass precursor gel in step 14, thus leading to clearer glass. Without being bound by theory, it is currently believed that the SLS glass precursor gel retains some of the soluble sodium byproduct that is generated when $Na_2O$ is displaced with CaO in step 12b. The sodium byproduct, believed to be sodium nitrate ($Na(NO_3)_2$), is a known oxidizing agent because, when heated, the nitrate decomposes to generate oxygen ($O_2$), nitric oxide (NO), and nitrogen dioxide ($NO_2$). Oxygen gas has been shown to evolve from the SLS glass precursor gel between about 450° C. and about 1500° C. when the gel is heated.

FIG. 3 is helpful in quantifying the tendency of the SLS glass precursor gel to produce flint glass without the blue/green tint. There, the transmittance profile of three samples of soda-lime-silica glass is depicted: two commercial samples produced from virgin crystalline raw materials and one sample produced from the SLS glass precursor gel. The iron content expressed as wt. % $Fe_2O_3$ (not a metric of the $Fe^{2+}/Fe^{3+}$ ratio) of the two samples produced from crystalline raw materials (samples A and B) and the sample produced from the SLS glass precursor gel (sample C) were measured by x-ray fluorescence and are set forth in table 3 below.

TABLE 3

Iron Content of Samples Expressed as wt. % $Fe_2O_3$

| Sample | Glass Source | wt. % $Fe_2O_3$ |
|---|---|---|
| A | Conventional Crystalline Raw Materials | 0.016 |
| B | Conventional Crystalline Raw Materials | 0.041 |
| C | SLS Precursor Gel | 0.042 |

As shown in the table above and the graph in FIG. 3, the soda-lime-silica glass obtained from the SLS glass precursor gel, which has 0.042 wt. % iron as $Fe_2O_3$, is akin to flint glass derived from conventional crystalline raw materials that has 0.016 wt. % iron as $Fe_2O_3$ in the 600-1200 nm spectral range. The suppression of $Fe^{2+}$ absorption in the glass obtained from the SLS glass precursor gel (sample C), again, is thought to be caused by residual sodium nitrate that is either trapped in the pores of the amorphous oxide-based matrix of the SLS glass precursor gel or chemically bound to the amorphous oxide-based matrix, despite the repeated separation, rinsing, and drying steps that may be carried out in step 12c.

The glass container may then be subject to additional manufacturing and/or handling after being formed in the section machine. Specifically, once the glass container emerges from the section machine, it may be cooled to preserve its shape, followed by re-heating in one or more annealing lehrs. The glass container may be re-heated (or annealed) in the annealing lehr(s), usually at a temperature between about 550° C. and about 600° C. for about 30 minutes to about 90 minutes, to remove stress points in the container. The glass container may then be cooled gradually. Any of a variety of hot-end, cold-end, antireflective, scratch-resistant, and/or glass strengthening coatings may be applied to the exterior surface of the glass container before the container is inspected and packaged.

The above discussion related to the glass precursor gel, although specifically directed to the preparation and use of a soda-lime-silica glass precursor gel, can nonetheless be adapted to prepare and use a glass precursor gel in other contexts, most notably the preparation and use of a glass precursor gel to make borosilicate glass or lead sealing glass. For each of borosilicate glass and lead sealing glass, the chemical synthesis of the glass precursor gel (step 12) is essentially the same, with the only significant difference being the way in which the composition of the dissolved alkali silicate is manipulated in solution and during precipitation. For example, to make borosilicate glass, boric acid could be added to the silicate solution to acidify the solution below the solubility limit of the silicate (below a pH of about 9.5-10) so that the wet precipitate, and thus the amorphous oxide-based matrix of the glass precursor gel, that eventfully results will incorporate $B_2O_3$. As another example, to make lead sealing glass, a soluble lead salt, such as lead nitrate, could be added to the silicate solution (in lieu of the soluble calcium salt) to incorporate PbO into the wet precipitate and, therefore, the amorphous oxide-based matrix of the glass precursor gel.

EXAMPLES

The following Examples demonstrate specific embodiments of the glass precursor gel, in particular a SLS precursor gel and methods of their manufacture, in accordance with the present disclosure.

Example 1

This example describes one way in which approximately 100 grams of the SLS glass precursor gel has been obtained. To begin, a silicate solution was purchased from PQ Corporation (Corporate headquarters in Malvern, Pa.). The silicate solution contained $Na_2O.xSiO2$, with x being 2.58, as a dissolved solids phase that was present at 37.1 wt. % in solution. 281 grams of the silicate solution was used without further dilution. Next, 5.75 grams of 15.5 M nitric acid was added to approximately 200 mL of deionized water, and the entire contents were then added to the silicate solution with vigorous stirring. The nitric acid was added to neutralize some of the sodium oxide content of the dissolved sodium silicate. After that, 20.6 grams of limestone (calcium carbonate) was dissolved in approximately 500 mL of deionized water with a stoichiometric amount of 15.5 M nitric acid (~37.2 grams) to convert the limestone into soluble calcium nitrate. Carbon dioxide was released at that time. The calcium nitrate solution was then added to the silicate solution with vigorous stirring at room temperature. A white wet precipitate formed immediately.

The silicate solution with precipitate was placed in plastic tubes and centrifuged for approximately 5 minutes to sediment the wet precipitate. The supernatant was then decanted and replaced with deionized water to rinse the wet precipitate. The centrifugation and rinsing procedures were repeated two more times and, after the last decanting step, no additional deionized water was added to the test tube. At that point the wet precipitate was spread on a dish and dried in a convection oven at 120° C. overnight. After drying, a SLS glass precursor gel was obtained in the form of brittle, chalky, white chunks that had a chemically homogenized chemical formulation. The SLS glass precursor gel was then melted in a platinum crucible at 1450° C. The SLS glass precursor gel was fully melted and bubble-free after 30 minutes. Additional melting of a similarly-formed SLS glass precursor gel was carried out at lower temperatures—specifically, 1200° C. and 1350° C.—and was found to be fully melted and bubble-free after 16 hours in each instance.

The target mole percentages of certain materials in the molten glass produced by the SLS glass precursor gel of this example are reported in table 4 below as "Reference 1." As can be seen, the target mole percentages of $SiO_2$, $Na_2O$, and CaO were 74.0, 13.6, and 12.4 respectively. The SLS glass precursor gel, in actuality, produced molten glass that contained weight percentages of $SiO_2$, $Na_2O$, and CaO that closely approached the target weight percentages of those primary constituent oxides. The SLS glass precursor gel can repeatedly achieve these compositions of the primary constituent oxides with less than a 1 mol % fluctuation in $Na_2O$ (i.e., target $Na_2O \pm 1.0$ mol %).

Example 2

In this example, the silicate solution was made from quartz sand instead of being purchased as in example 1. To begin, 374 grams of quartz sand was added to a 5.7 M NaOH solvent. This mixture was placed in a stirred autoclave reaction vessel and reacted for 12 hours at 250° C. Over 99.9 mol % of the quartz sand was dissolved. The resulting silicate solution contained dissolved sodium silicate having the chemical formula $Na_2O.xSiO2$ with x being about 2.6. An SLS glass precursor gel was ultimately made using the silicate solution in the same manner set forth in example 1. It also melted in the same way with the same results. The mole percentages of certain materials in the molten glass produced by the SLS glass precursor gel of this example are reported below in table 4.

Example 3

In this example, aluminum oxide was introduced into the silicate solution and, ultimately, the SLS glass precursor gel. Here, when making the silicate solution, 853 grams of water, 218 grams of NaOH, 321 grams of quartz sand, and 29 grams of nepheline syenite were mixed in a stirred autoclave reaction vessel. The mixture was reacted for 10 hours at 250° C. and was prepared with a target molar ratio of $Na_2O$ to $SiO_2$ of 1:2. After the hydrothermal treatment, the resultant silicate solution was filtered through #40 Whatman paper. It was found that 6.3 wt. % of the original solids did not dissolve. And since the nepheline syenite accounted for 8.3 wt. % of the original solids, it was believed that at least some of the nepheline syenite dissolved into the silicate solution. The filtered silicate solution was then used to make a SLS glass precursor gel as set forth in example 1 with the adjustment of more nitric acid to compensate for the greater molar ratio of $Na_2O$ to $SiO_2$ in the dissolved sodium silicate. The molten glass produced by the SLS glass precursor gel of this example was found to contain about 0.5% $Al_2O_3$. The mole percentages of $Al_2O_3$ and other materials in the molten glass are reported below in table 4.

Example 4

This example describes yet another way to introduce aluminum oxide into the silicate solution and, ultimately, the SLS glass precursor gel. Here, the SLS glass precursor gel was prepared in the same way as in example 1, except that aluminum hydroxide was dispersed in the nitric acid used to neutralize some of the $Na_2O$. The aluminum hydroxide did not fully dissolve in the silicate solution. After the SLS glass precursor gel was made using the silicate solution, and upon being heated, the residual aluminum hydroxide converted to alumina with the release of water. And after only 15 minutes of melting the SLS glass precursor gel at 1450° C., there were no alumina stones observed in the glass melt, even though alumina is a refractory material. The molten glass produced by SLS glass precursor gel of this example was found to contain about 1.0 mol % $Al_2O_3$ as is reported below in table 4 along with the mole percentages of other materials in the molten glass.

Example 5

The SLS glass precursor gel was prepared here as described in example 1 with a few modifications. First, to introduce aluminum oxide into the silicate solution and the SLS glass precursor gel, the amount of sodium aluminate needed to yield 1.0 mol % $Al_2O_3$ in the dissolved sodium silicate was dissolved in water and mixed with the silicate solution recited in example 1. Second, a blend of calcium nitrate and magnesium nitrate was used to precipitate the dissolved sodium silicate into the wet precipitate with the intent of adding a small amount of MgO along with CaO. The amounts of $Al_2O_3$ and MgO sought to be added to the molten glass produced by the SLS glass precursor gel in this example are reported in table 4 below as "Reference 2." The molten glass produced by melting the SLS glass precursor gel was found to contain about 0.9 mol % and 2.7 mol % of $Al_2O_3$ and MgO, respectively, which is also reported below in table 4 along with the mole percentages of other materials in the molten glass.

Example 6

The SLS glass precursor gel in this example was prepared as described in example 1 except that cobalt oxide (CoO) and chromium(III) oxide ($Cr_2O_3$) were added to the silicate solution before precipitation with the calcium nitrate. These oxides did not dissolve, but were instead dispersed in the silicate solution with vigorous mixing before precipitation. The cobalt oxide and chromium(III) oxide were added to the silicate solution in amounts needed to achieve 25 ppm and 1 ppm, respectively, in the wet precipitate. The SLS glass precursor gel that was made using the silicate solution looked the same as the SLS glass precursor gel of example 1. After heating the SLS glass precursor gel of this example for 5 minutes at 1450° C., however, a chemically homogeneous and dark blue molten glass was attained that did not have any stones or streaks of color. Furthermore, after continued heating at 1450° C. for 1 hour, the molten glass was free of bubbles.

Example 7

The SLS glass precursor gel in this example was prepared as described in example 1 except that $Fe_2O_3$, carbon, and sulfate anions were added to the SLS glass precursor gel. $Fe_2O_3$ and carbon were added as insoluble compounds prior to precipitation of the dissolved sodium silicate. The sulfate anions were added to the wet precipitate in the form of sulfuric acid after the final rinsing step and before drying. Adding the sulfate anions (via sulfuric acid) at this time was done because sodium sulfate would have been easily rinsed away during the rinsing steps. The SLS glass precursor gel made in this example, when melted, produced molten glass having an aquamarine blue color, which was somewhat out of the ordinary since the added compounds employed here typically produce an amber/brown color. The aquamarine blue color observed here suggests that the iron/sulfur complex experienced a more oxidizing environment than what would normally be found in conventional molten glass derived from crystalline raw materials. This belief is consistent with the transmission data for clear soda-lime-silica glass shown in FIG. 3 and the belief that an oxidizing environment arises on account of residual sodium nitrate byproducts left over in the SLS glass precursor gel.

Example 8

In this example, the SLS glass precursor gel was prepared as described in example 7 except that that amount of carbon added was increased. Because carbon is a reducing agent, the increase in added carbon was intended to overcome the oxidizing environment apparently attributed to residual sodium nitrate byproducts in the SLS glass precursor gel. The molten glass that resulted from melting the SLS glass precursor gel of this example was brown in color.

TABLE 4

Compositions of Melted Glass as Measured by X-Ray Fluorescence

| | Glass Composition in mol % | | | | |
| --- | --- | --- | --- | --- | --- |
| | $SiO_2$ | $Na_2O$ | CaO | MgO | $Al_2O_3$ |
| Example 1 | 72.5 | 13.8 | 12.4 | 1.2 | 0.1 |
| Example 2 | 72.1 | 13.3 | 13.0 | 1.5 | 0.1 |
| Example 3 | 72.3 | 12.3 | 13.4 | 1.5 | 0.5 |
| Example 4 | 71.7 | 14.0 | 11.9 | 1.4 | 1.0 |
| Example 5 | 71.2 | 12.8 | 12.4 | 2.7 | 0.9 |
| Reference 1 | 74.0 | 13.6 | 12.4 | 0 | 0 |
| Reference 2 | 72.2 | 13.0 | 11.2 | 2.5 | 1.0 |

There thus has been disclosed a glass precursor gel that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of making a glass product, the method comprising:

obtaining a glass precursor gel that comprises a homogeneously chemically mixed bulk amorphous oxide-based matrix and an extending swelling agent, the bulk amorphous oxide-based matrix having an inorganic network of primary constituent oxides within which the extending swelling agent is entrapped, the primary constituent oxides comprising 30 mol % to 90 mol % silica and one or more of the following: (A) 0.1 mol % to 25 mol % of one or more alkali oxides in sum total, (B) 0.1 mol % to 25 mol % of one or more alkaline earth oxides in sum total, (C) 1 mol % to 20 mol % boric oxide, (D) 5 mol % to 80 mol % lead oxide, or (E) 0.1 mol % to 10 mol % aluminum oxide;

melting the glass precursor gel into molten glass; and forming the molten glass into a glass product.

2. The method set forth in claim 1, wherein the step of obtaining the glass precursor gel comprises:

providing a silicate solution that includes a dissolved alkali silicate, the dissolved alkali silicate having a molar ratio of an alkali oxide to silica;

adding an alkaline earth salt to the silicate solution to displace some of the alkali oxide with an alkaline earth oxide and to derive a wet precipitate having a molar ratio of the alkali oxide to the alkaline earth oxide to silica; and removing liquid solvent from the wet precipitate to obtain the glass precursor gel.

3. The method set forth in claim 2, further comprising:

adjusting the molar ratio of the alkali oxide to silica in the dissolved alkali silicate by neutralizing some of the alkali oxide with an acid such that the molar ratio of the alkali oxide to silica is reduced.

4. The method set forth in claim 1, wherein the molar ratio of the alkali oxide to the alkaline earth oxide to silica is between 0.8:0.8:6 and 1.4:1.3:6.

5. The method set forth in claim 1, wherein the step of melting the glass precursor gel is performed at 1200° C. to 1450° C. for a period of 30 minutes to 16 hours.

6. A method of making a glass product, the method comprising:

providing a silicate solution that includes a dissolved sodium silicate, the dissolved sodium silicate comprising a molar ratio of $Na_2O$: $SiO_2$;

adding a soluble calcium salt to the silicate solution to displace some of the sodium oxide in the dissolved sodium silicate with calcium oxide and to derive a wet precipitate that comprises a molar ratio of $Na_2O$:CaO: $SiO_2$;

removing solvent from the wet precipitate to obtain a soda-lime-silica glass precursor gel, the gel comprising a bulk amorphous oxide-based matrix having an inorganic network of oxides that comprises 60 mol % to 85 mol % silica, 8 mol % to 18 mol % sodium oxide, and 5 mol % to 15 mol % calcium oxide;

melting the soda-lime-silica glass precursor gel into molten glass; and forming the molten glass into a glass product.

7. The method set forth in claim 6, wherein providing the silicate solution comprises dissolving quartz sand in a sodium-based solvent at a temperature between 25° C. and 300° C. and a pressure of 10 atmospheres to 100 atmospheres for 3 hours to 24 hours.

8. The method set forth in claim 6, further comprising:

adjusting the molar ratio of $Na_2O$:$SiO_2$ in the dissolved sodium silicate by neutralizing some of the sodium oxide with an acid such that the molar ratio of $Na_2O$: $SiO_2$ is reduced.

9. The method set forth in claim 6, wherein the step of adding a soluble calcium salt includes displacing sodium oxide in the dissolved sodium silicate with calcium oxide such that the molar ratio of $Na_2O$:CaO:$SiO_2$ in the wet precipitate is between 0.8:0.8:6 and 1.4:1.3:6.

10. The method set forth in claim 6, wherein forming the molten glass into a glass product comprises:

thermally conditioning the molten glass at a temperature of about 1050° C. to about 1200° C. after the molten glass has been removed from a furnace;

delivering a gob of the molten glass to an individual section machine; and forming the molten glass into a glass container in the individual section machine, the glass container having a glass body defining an interior accessible at a mouth located at one axial end of the glass body.

11. The method set forth in claim 6, wherein the soluble calcium salt includes at least one of calcium nitrate, calcium chloride, or calcium hydroxide.

12. The method set forth in claim 6, wherein the silicate solution is concentrated to at least 5 wt. % of the dissolved sodium silicate at the time the soluble calcium salt is added to the silicate solution.

13. The method set forth in claim 6, wherein the step of melting the soda-lime-silica glass precursor gel evolves oxygen gas between 450° C. and 1500° C.

14. The method set forth in claim 6, wherein the step of melting the soda-lime-silica glass precursor gel does not release carbon dioxide gas.

15. The method set forth in claim 6, wherein the step of melting the soda-lime-silica glass precursor gel evolves water vapor above 125° C.

16. A method of making a glass product, the method comprising:

melting a soda-lime-silica glass precursor gel into molten glass, the soda-lime-silica glass precursor gel comprising a bulk amorphous oxide-based matrix having an inorganic network of primary constituent oxides and water chemically-entrained within the inorganic network of primary constituent oxides, the primary constituent oxides comprising 60 mol % to 85 mol % silica, 8 mol % to 18 mol % sodium oxide, and 5 mol % to 15 mol % calcium oxide; wherein the bulk amorphous oxide-based matrix is homogenously chemically mixed and, further, wherein the glass precursor gel has a density of less than 2.0 g/cm$^3$;

forming the molten glass into a glass product.

17. The method set forth in claim 16, wherein the inorganic network of primary constituent oxides further comprises aluminum oxide.

18. The method set forth in claim 16, further comprising:

providing a silicate solution that includes a dissolved sodium silicate, the dissolved sodium silicate comprising a molar ratio of $Na_2O$: $SiO_2$;

adding a soluble calcium salt to the silicate solution to displace some of the sodium oxide in the dissolved sodium silicate with calcium oxide and to derive a wet precipitate that comprises a molar ratio of $Na_2O$:CaO:$SiO_2$; and removing solvent from the wet precipitate to obtain the soda-lime-silica glass precursor gel.

19. The method set forth in claim 16, wherein, during melting of the soda-lime-silica glass precursor gel, water vapor is evolved above 125° C. and oxygen gas is evolved between 450° C. and 1500° C.

20. The method set forth in claim 16, wherein forming the molten glass into a glass product comprises:
   thermally conditioning the molten glass at a temperature of about 1050° C. to about 1200° C. after the molten glass has been removed from a furnace;
   delivering a gob of the molten glass to an individual section machine; and
   forming the molten glass into a glass container in the individual section machine, the glass container having a glass body defining an interior accessible at a mouth located at one axial end of the glass body.

* * * * *